US012623389B2

(12) United States Patent
　　Duffner et al.

(10) Patent No.:　US 12,623,389 B2
(45) Date of Patent:　May 12, 2026

(54) HYDRAULIC DEVICE AND METHOD FOR REGULATING A HYDRAULIC DEVICE

(71) Applicant: ARBURG GMBH + CO KG, Loßburg (DE)

(72) Inventors: Eberhard Duffner, Starzach (DE); Walter Fest, Lossburg (DE)

(73) Assignee: ARBURG GMBH + CO KG, Lossburg (DE)

( * ) Notice: Subject to any disclaimer, the term of this patent is extended or adjusted under 35 U.S.C. 154(b) by 66 days.

(21) Appl. No.: 18/277,621

(22) PCT Filed: Feb. 21, 2022

(86) PCT No.: PCT/EP2022/054212
§ 371 (c)(1),
(2) Date: Aug. 17, 2023

(87) PCT Pub. No.: WO2022/179971
PCT Pub. Date: Sep. 1, 2022

(65) Prior Publication Data
US 2024/0131767 A1　　Apr. 25, 2024
US 2024/0227269 A9　　Jul. 11, 2024

(30) Foreign Application Priority Data
Feb. 24, 2021　(DE) ..................... 10 2021 104 398.0

(51) Int. Cl.
B29C 45/82　　(2006.01)

(52) U.S. Cl.
CPC ........ B29C 45/82 (2013.01); B29C 2045/826 (2013.01); B29C 2945/76056 (2013.01); B29C 2945/76307 (2013.01)

(58) Field of Classification Search
CPC .............. B29C 45/82; B29C 2045/826; B29C 2945/76056; B29C 2945/76307; B29C 2945/76006; B29C 45/76
See application file for complete search history.

(56) References Cited

U.S. PATENT DOCUMENTS

| | | | | |
|---|---|---|---|---|
| 4,455,614 A | * | 6/1984 | Martz | ..................... F01K 23/10 |
| | | | | 290/40 R |
| 5,052,909 A | * | 10/1991 | Hertzer | ................... B29C 45/82 |
| | | | | 425/150 |

(Continued)

FOREIGN PATENT DOCUMENTS

| | | |
|---|---|---|
| DE | 69103228 T2 | 9/1994 |
| DE | 19680008 C1 | 1/2002 |

(Continued)

OTHER PUBLICATIONS

International Search Report for corresponding application PCT/EP2022/054212 filed Feb. 21, 2022. Mail date Jun. 10, 2022.

(Continued)

*Primary Examiner* — Ziaul Karim
(74) *Attorney, Agent, or Firm* — CANTOR COLBURN LLP

(57) ABSTRACT

The invention relates to a hydraulic device for supplying a plurality of work units (3a, 3b), in particular on a plastics injection moulding machine, said device comprising at least one controller (7), at least one valve regulator and/or one valve controller and a central drive (1). A regulating valve (13a, 13b) with a regulating-valve geometry is provided on at least one of the work units (3a, 3b). Pressure sensors (8) detect at least one pressure both upstream and downstream of the regulating valve (13a, 13b), the load pressure (10a, 10b) of at least one of the work units (3a, 3b), and the system pressure (9). Since the valve regulator and/or the valve controller has knowledge about the regulating-valve geom- (Continued)

etry of the at least one regulating valve (13a, 13b) and is designed to derive, from a relationship between the regulating-valve geometry and at least one pressure difference resulting from the pressures detected upstream and downstream of the regulating valve (13a, 13b), at least one volume flow rate actual value per regulating valve (13a, 13b), and the controller (7) is designed to derive, from the volume flow rate setpoint values of the at least one work unit (3a, 3b) and/or the volume flow rate actual values of the at least one regulating valve (13a, 13b), at least one setpoint value feedforward control for the central drive (1) in such a way that the system pressure (9) corresponds at least to the relevant highest load pressure (10a, 10b) of the work units (3a, 3b), the hydraulic device is improved in terms of functionality, energy, efficiency and economy.

17 Claims, 6 Drawing Sheets

(56) References Cited

U.S. PATENT DOCUMENTS

| | | | |
|---|---|---|---|
| 6,120,711 A | 9/2000 | Takizawa | |
| 2005/0273204 A1* | 12/2005 | Hansen | G05D 7/005 |
| | | | 700/282 |
| 2007/0006580 A1* | 1/2007 | Hesse | F15B 11/165 |
| | | | 60/452 |
| 2013/0118609 A1* | 5/2013 | Horsky | G05D 7/0635 |
| | | | 137/505 |
| 2016/0274561 A1* | 9/2016 | Stone | B29C 45/766 |
| 2017/0204803 A1* | 7/2017 | Pursifull | F02D 41/123 |
| 2018/0180069 A1* | 6/2018 | Wagner-Stuerz | F15B 21/08 |
| 2022/0152900 A1* | 5/2022 | Nakamura | B29C 45/766 |

FOREIGN PATENT DOCUMENTS

| | | |
|---|---|---|
| DE | 10308289 A1 | 9/2004 |
| DE | 10340993 A1 | 3/2005 |
| DE | 102009020111 A1 | 11/2010 |
| DE | 102011012714 A1 | 10/2011 |
| DE | 102015201318 A1 | 8/2016 |
| EP | 0649722 B2 | 3/2005 |
| JP | H10272666 A | 10/1998 |
| JP | 2011140058 A | 7/2011 |
| WO | 2005024245 A1 | 3/2005 |

OTHER PUBLICATIONS

Japanese Office Action; Application No. 2023550674; date of mailing: Sep. 24, 2025; 10 pages.

* cited by examiner

HYDRAULIC DEVICE AND METHOD FOR REGULATING A HYDRAULIC DEVICE

CROSS REFERENCE TO RELATED APPLICATIONS

The present application relates to and claims priority from German patent application 10 2021 104 398.0, filed on Feb. 24, 2021, the disclosure content of which is hereby incorporated by reference in its entirety.

TECHNICAL FIELD

The disclosure relates to a hydraulic device for supplying at least one work unit, in particular on a plastics injection molding machine and to a method for open-loop control and/or closed-loop control of a hydraulic device.

BACKGROUND

Even in modern—for example electromechanically driven—injection molding machines, hydraulic consumers or axes, such as ejectors, nozzle contact, core pullers, and shut-off nozzles, continue to be present and have to be supplied with energy by the injection molding machine. On the one hand, in the case of certain machine axes which most of the time work only in force-controlled operation, such as in the case of a nozzle contact function, an electromechanical drive has not proved suitable in terms of service life, and on the other hand, in particular in the mold area, hydraulic actuators offer major structural and economic advantages because of their high power density and low cost of installation. Similarly, for reasons of the compatibility of new machines with existing molds, an integrated supply of hydraulic power is required for new electromechanically driven and energy-optimized machines.

DE 10 2009 020 111 A1 discloses a hydrostatic drive system that has a pump with load-sensing control and at least one consumer that is controllable by a control valve. An electronic pressure difference control is provided for closed-loop control of the flow volume of the pump, wherein a sensor device for detecting a pressure difference from the (maximum) load pressure of a plurality of consumers and the feed pressure of the pump is provided, wherein the control device adjusts the pump such that the pressure difference corresponds to a pre-set closed-loop control difference. Thus, a pre-set (that is to say fixed) closed-loop control pressure difference between a load pressure (preferably the maximum) and the feed pressure of the pump is closed-loop controlled. Thus, the input pressure and hence the pressure difference at the closed-loop control valve for the second or further consumers depend on the load pressure on the first or leading consumer, and so cannot be kept constant. The flow rate of the second or further consumer is thus not proportional to the cross section of opening of the valve and is thus not defined. Either a respective pressure gage is needed for the respective closed-loop control valve of the non-leading consumers, or the consumer needs a return conduit of a size appropriate to the flow rate in order to divide up the flow rate between the consumers as necessary. It is not apparent how dividing up the volumetric flows as necessary is performed. Only the sum of the flow rates is to correspond to the needs of all the consumers, because the leading pressure difference is maintained (and collapses in the event of under-supply).

DE 10 2015 201 318 A1 discloses a hydraulic control arrangement for supplying compressed medium to at least two hydraulic consumers. An adjustable hydraulic pump is variable such that the pump pressure lies above, by a pump pressure difference, the maximum load pressure of the simultaneously activated hydraulic consumers. For this purpose, pressure gages are used for each closed-loop control valve. Here, the closed-loop pump control device is activated such that pressure drops in the pump conduit which differ in respect of the size of the pump pressure difference are taken into account, and the individual pressure gage that is associated with the hydraulic consumer having the highest load pressure is at least approximately completely opened if there are differing pressure drops in the pump conduit.

EP 0 649 722 B2 discloses a hydraulic device for supplying a work unit on a plastics injection molding machine having at least one consumer. A pressure sensor detects actual pressure values and compares them with a setpoint pressure value, as a result of which a control variable for the closed-loop control member of the closed-loop control pump is delivered, for the purpose of a correcting control of the drop in operating pressure, as load sensing. The maximum output of the closed-loop control pump is predetermined by the frequency converter, on the basis of values predetermined for the respective injection cycle, in dependence on a further control variable that depends on quantity and pressure, wherein the pump output of the closed-loop control pump below its maximum output is actively controllable by the controller at the closed-loop control member, by the first control variable.

DE 196 80 008 C1 discloses a device having at least one controlled hydraulically driven actuator, a hydraulic pump and an open or closed-loop control device. The open or closed-loop control device acts on the electrical drive of the hydraulic pump on the basis of detected actuator data, and this leads by way of a conduit with no dissipative correcting elements—that is to say with no closed-loop control valves—to an actuator but does not produce any change in load on the hydraulic pump.

DE 10 2011 012 714 A1 discloses a hydraulic drive unit for an injection molding machine, wherein the flow rate of hydraulic fluid per time unit is measured by a measuring device and forwarded as a corresponding signal to the open or closed-loop control unit, which calculates therefrom the position of the piston.

At present, in the further existing prior art, substantially two basic variants on the supply of fluidic power in a manner integrated into the injection molding machine are conventional.

The first variant, for purely serial core puller or minor axis functions, is implemented using so-called servo-electrically controlled constant pumps and a simple axis sequence valve. In this way, a plurality of axes can be operated sequentially and in a manner adapted to need, by a pump and servomotor drive unit that is adapted to the axis consumer for energy optimization. Further known from the prior art are hydraulic systems in which a plurality of consumers or axes is supplied by the same pressure or volumetric flow source at the same time. The volumetric flow from the source is divided up between the consumers. So-called flow divider valves or internally toothed gear flow dividers are used for example for statically dividing up.

The second variant, for example for high-power machines with a plurality of simultaneous and highly dynamic demands on the fluidic power supply, is usually implemented using a constant pressure supply through hydraulic accumulators (or one constant pressure pump of large size) and a volume pressure closed-loop control valve on the individual consumer. A particular challenge to dynamically dividing up the volumetric flow arises if the source is to provide the pressure and the volumetric flow according to demand. In order to avoid affecting the axial movements or axial forces in cases where a plurality of axes is connected in parallel, a system pressure/storage pressure with a large reserve is provided. This results in behavior that is correspondingly unfavorable from an energy point of view, since the power of excess pressure that is not required times the required volume in the closed-loop control valve has to be converted into heat in the carrier medium. Since injection molding machines are universally purchased, the second variant, with a mold having only sequential movement, is not able to perform an energy-optimized cycle in accordance with the first variant, and conversely the first variant cannot serve molds having simultaneous core puller movements. Proportional flow-control valves may for example be used for dynamically dividing up, each one associated with a respective consumer.

Also known from the prior art are further configurations in which a plurality of servo pumps of the first variant is installed, or added as necessary. However, these configurations have considerable commercial disadvantages and, as regards the overall energy balance, for certain operating point demands are in some cases worse from an energy point of view than constant pressure systems (frequent changes in output, frequent speeding up and slowing down of the drive, high demand for pressure maintenance function). The flexibility of these configurations is also very restricted, since the specification for the synchronization of minor axes is immutably fixed when the machine is set up.

Known solutions in the prior art have the effect that the consumers affect one another to such an extent that this may be relevant to their use and may thus also have an adverse effect on the quality of the injection molded parts that are to be made.

BRIEF SUMMARY

The disclosure provides a hydraulic device for supplying at least one work unit, in particular on a plastics injection molding machine, wherein the hydraulic device is improved in terms of functionality, energy, efficiency and cost effectiveness.

The hydraulic device for supplying a plurality of work units, in particular on a plastics injection molding machine for processing plastics and other plasticizable materials, has at least one controller, at least one closed-loop valve control and/or open-loop valve control, and a central drive. The controller may comprise the closed-loop valve control and/or open-loop valve control or vice versa. For each work unit, at least one closed-loop control valve having a control valve geometry (e.g. a slide-valve geometry) is provided, preferably an electronic and/or digital closed-loop control valve. The closed-loop control valves may take the form for example of continuously-adjustable valves or proportional valves that control the volumetric flow to the work units. Further, pressure sensors such as pressure transducers are provided, which for each closed-loop control valve detect at least one pressure upstream and downstream of the closed-loop control valve, the load pressure of the work units and the system pressure. In principle, it is also possible for only one of the work units to be equipped with the closed-loop control valve, while the other work units are activated for example by a sequence valve. For each work unit, preferably at least one digital closed-loop control valve with a slide-valve geometry and integrated closed-loop valve control and/or open-loop valve control may be provided. The closed-loop control valves may take the form for example of continuously-adjustable valves that control the volumetric flow to the work units.

In order advantageously to achieve an improvement on the existing solutions in the prior art in terms of functionality, energy, efficiency and cost effectiveness, the closed-loop valve control and/or open-loop valve control comprises knowledge of the control valve geometry of the closed-loop control valves, for example in the form of a control characteristic, a volumetric flow signal characteristic or the function "cross section of opening=f(stroke)", or geometry of the valve slider, and is configured to derive at least one actual value of volumetric flow for each closed-loop control valve from a relationship between the control valve geometry and at least one pressure difference that results from the pressures detected upstream and downstream of the at least one closed-loop control valve. The controller is configured to derive, from the setpoint of volumetric flow of the at least one of the work units or the plurality of work units and/or from the actual values of volumetric flow of the at least one closed-loop control valve, at least one setpoint pre-control for the central drive, such that the system pressure corresponds at least to the maximum load pressure of the at least one work unit. In this context, the system pressure corresponding at least to the maximum load pressure means that the system pressure is greater than or equal to the load pressure and may even exceed this for example by a certain value. In this way, advantageously no pressure gages are needed, for example.

The value may be for example manually and/or automatically predetermined, for example by the controller. It is also possible for the value to be predetermined in dependence on parameters of the injection molding process. The knowledge may take the form for example of algorithms, functions and/or control characteristics in an electronic and/or digital memory. In principle, it is conceivable for the knowledge already to be present in the closed-loop control valve and/or open-loop control valve, or to be manually input or automatically made available, for example by way of a network connection.

For each closed-loop control valve a corresponding volumetric flow, for example a corresponding standardized volumetric flow, e.g. in liters/min, results from a certain pressure difference and a certain setting of the valve. In this way, the closed-loop control valves is used to set standardized operation commands and/or flow rates of the work units independently of the system pressure and/or load pressure of the work units. Further advantageously, calibration tasks are thus dispensed with during servicing, since the closed-loop control valves do not need to be adjusted again.

As an example, two types of valve are used, with the first valve having for example a nominal maximum volumetric flow of 180 liters/min and the second valve having a nominal maximum volumetric flow of for example 140 liters/min. In this example, with linearized characteristics and with a control variable of 50% the first valve would be adjusted to a volumetric flow of 90 liters/min and with a control variable of 50% the second valve would be adjusted to a volumetric flow of 70 liters/min, provided that there is sufficient supply pressure.

In this context the term "standardized," for a standardized volumetric flow and/or a standardized flow rate, means that the setpoint value for the volumetric flow and/or the flow rate is for example pre-set to 80 liters/min and so both valves are adjusted to a volumetric flow of 80 liters/min, regardless of fluctuations in pressure and regardless of the nominal maximum volumetric flow. The result is thus a flow rate or volumetric flow that is standardized in dependence on a control variable and is independent of load pressure and system pressure. Preferably, the result is thus, for example when using different valves or if other system components are replaced, that no new closed-loop control/open-loop control needs to be implemented.

In principle, it is also possible to standardize to variables other than the volumetric flow or flow rate, provided a correspondingly associated variable is settable in standardized manner and scaled by way of an operation command.

In this context the term "standardized operation command" means a command by which for example a standardized volumetric flow and/or flow rate may be set. For example, variables to be standardized may be mapped onto (standardized to) a volumetric flow, for example in liters/min, so that the desired volumetric flow may be set or controlled by closed-loop control for example by a characteristic, regardless of the valve used (system and load pressure).

Advantageously, in the case of pre-control that is based on the actual values of volumetric flow, appropriate pre-control may be performed even if the closed-loop control valves are undergoing closed-loop pressure control and so their volumetric flow is not (only) dependent on the setpoint value of volumetric flow.

In this way, the closed-loop control valve can correct for a physically standardized flow rate at the work unit, advantageously in accordance with the predetermined setpoint value and regardless of the system and load pressures, and can carry out the pressure maintenance function in a quasi-static condition of the closed-loop pressure control, regardless of fluctuations in the system pressure. It goes without saying that this only applies while the hydrodynamic preconditions prevail for compensating losses through the valve by a corresponding delta p as the differential pressure between the system pressure and the load pressures.

In this way, advantageously in terms of functionality, energy, efficiency and cost effectiveness, volumetric flow and/or pressure are not made available any more than is specifically necessary for the total of the work units. For this purpose, the volumetric flow and/or pressure of the central drive is divided up between the work units. In so doing, advantageously the effect the work units have on one another is minimized and it is always possible to control by closed-loop control and/or to limit the volumetric flow and/or the pressure of each work unit independently of other work units.

Typically, when closed-loop control valves of this kind and a corresponding controller are used, advantageously substantially faster adjustability and a dynamic response of the whole pressure supply are the result.

For example, for at least two simultaneous, unaffected work unit movements, the optimal system pressure is realized by creating a superimposition by the central drive, corresponding to the maximum pressure requirement of the at least two simultaneously operable work units, by a corresponding activation of the central drive by the controller with a closed-loop control that is correct for the system, of quantity (motor speed) and system pressure in superimposition.

Preferably, a closed-loop control valve controls each work unit of the plurality of work units. As a result, advantageously an exact and precise pre-control of the setpoint value can be achieved for all the work units even with the work units moving simultaneously, and this contributes to the quality of the injection molded parts that are to be produced.

Preferably, the closed-loop valve control and/or open-loop valve control has knowledge of the hydraulic medium used, advantageously resulting in an exact and precise pre-control of the setpoint value. For example, viscosity plays a considerable part in laminar flow in the gap of the valve slider, and this has an effect as regards application to the volumetric flow in the vicinity of the zero point (overlap edge). Preferably, the closed-loop valve control and/or open-loop valve control knows the exact relationship between pressure or pressure difference, the setting of the closed-loop control valve and the volumetric flow in relation to the hydraulic medium used.

In an injection molding machine, for example, the hydraulic medium is usually distributed to the work unit by way of compressible volumes such as hoses, with the result that a certain hydraulic storage action or hydraulic capacity assists the system in overcoming sudden changes in load, for example when a work unit passes an abutment element, in the closed-loop control dynamic at the second work unit without affecting the work unit that is itself to be subject to control.

Likewise, compressible dead volumes of the central drives and controller, which always exist in real plant, make it possible, by observation of the system pressure directly at the pressure supplier, to reduce and increase the volume throughput of the pressure supplier, with its slower dynamic than that of the closed-loop control valve, promptly and energy-efficiently as a response to pressure/quantity.

It is advantageous for improved modularity in the plant construction if the closed-loop valve control and/or open-loop valve control is preferably provided in or on the closed-loop control valve. As a result, the closed-loop control valve advantageously "identifies" itself, such that when there is a change in the closed-loop control valve no calibration needs to be carried out. In principle, however, it is also possible for the closed-loop valve control and/or open-loop valve control to be provided at a different location, for example in or on the controller. It is also conceivable for the controller to be or to comprise the closed-loop valve control and/or open-loop valve control.

Preferably, at least one temperature sensor, for example a temperature detector, is provided, as a result of which advantageously precise predictions may be made of the viscosity of the hydraulic medium and so more exact throughflow is produced. Further preferably, at least one temperature sensor is provided for each closed-loop control valve. Advantageously, as a result of this the viscosity for each work unit branch may be more exactly determined.

Since injection molding machines are usually constructed individually and in modular manner, it is likewise advantageous for enhanced modularity in the plant construction if the pressure sensor is preferably provided in or on the closed-loop control valve. If the valve is replaced, for example because of restructuring, advantageously no further restructuring measures need to be carried out.

In principle, it is possible for preferably each closed-loop control valve to have a pressure sensor, a temperature sensor and/or a closed-loop valve control and/or open-loop valve control.

Preferably, the control valve geometry of the closed-loop control valves is the slide-valve geometry of the valve slide, with the result that advantageously, and knowing this geometry, a reliable, cost-efficient and energy-efficient closed-loop control for example of the volumetric flows is made possible in terms of dividing up a feed flow.

Moreover, the object is achieved by a method. In order to improve on the existing solutions in the prior art in terms of functionality, energy, efficiency and cost effectiveness, for the purpose of open-loop and/or closed-loop control of a hydraulic device for supplying a plurality of work units, in particular on a plastics injection molding machine comprising at least one controller and a central drive, for example a pump, at least one closed-loop control valve is provided at each of at least one of the work units, wherein for each closed-loop control valve at least one pressure difference is determined from at least one detected pressure upstream and downstream of the closed-loop control valve, at least one actual value of volumetric flow for each closed-loop control valve is derived from a relationship between the control valve geometry and the pressure difference of the closed-loop control valve, and at least one setpoint pre-control for the central drive is derived from the setpoint values of volumetric flow of the at least one work unit and/or the actual values of volumetric flow of the at least one closed-loop control valve, such that the system pressure corresponds at least to the maximum load pressure of the work units. In this context, the system pressure corresponding at least to the maximum load pressure means that the system pressure is greater than or equal to the load pressure and may even exceed this for example by a certain value.

Operation commands that are standardized to the at least one closed-loop control valve and/or flow rates and/or volumetric flows through the work units are set independently of the system pressure and/or the load pressure of the at least one work unit, such that advantageously a desired volumetric flow can be set or controlled by closed-loop control by a characteristic. The result is thus for example a flow rate or volumetric flow that is standardized in dependence on a control variable.

Preferably, a closed-loop control valve controls the pressure of each of the plurality of work units. As a result, advantageously an exact and precise pre-control of the setpoint value can be achieved for all the work units even with the work units moving simultaneously, and this contributes to the quality of the injection molded parts to be produced.

For advantageously fast adjustability and precise provision of the flow rates, preferably pre-control of the setpoint value is carried out with time control and/or in real time. For example, pre-control of the setpoint value may be carried out with time control with the work units on the basis of the setpoint values of the volumetric flow of the work units, and/or in real time on the basis of the actual values of the volumetric flow of the closed-loop control valves. In this context, the term "time-coordinated" means that the setpoint value of volumetric flow is made available to the work units at a particular point in time by the setpoint pre-control. For example, setpoint pre-control may advantageously provide an appropriate setpoint pre-control in real time on the basis of the actual values of volumetric flow even if the closed-loop control valves are undergoing closed-loop pressure control and so their volumetric flow is not (only) dependent on the setpoint value of volumetric flow.

In order advantageously to identify leaks at the work units, preferably at least one cyclic integration of the standardized volumetric flow that is controlled by the closed-loop control valves is carried out over at least one work unit cycle. It can then be seen from the integral, for example by comparison with a previous work unit cycle, whether there is a leak.

For advantageous identification of wear to the valve mechanism, for example on control edges or in the event of a leak through a piston, the actual values of volumetric flow of the closed-loop control valves are preferably continuously monitored, evaluated and correlated with the actual values of volumetric flow for at least one cyclic machine operation. For example, by comparison with earlier work unit cycles conclusions can thus be drawn about wear.

For operation that is advantageously energy-optimized, and for an improvement in application to the demands for simultaneity or for greater demands of dynamics and reproducibility, the at least one closed-loop control valve is preferably operated as a switching valve during serial movements of the at least one work unit, and/or the closed-loop control valve is operated as a load-sensing closed-loop control valve during simultaneous movements of the work units. Advantageously, the work units may thus be operated directly by the controller and the central unit during the injection molding cycle. For example, as a switching valve the closed-loop control valves are switched to maximum throughflow or to closed by the controller. Because there are no hydromechanical pressure gages, advantageously approximately the same energy efficiency is thus achieved in serial operation as for purely serial pump systems with a sequence valve for the work unit.

For an advantageous optimum of dynamics and energy consumption per cycle, the derivation of the setpoint pre-control is preferably adapted with self optimization by a cyclically learning observer. For example, the superimposition of pressure in the system circuit may be adapted to optimum dynamics and energy consumption/cycle with self-optimization by the cyclically learning observer, while observing the quality of closed-loop control in the work unit circuits, in particular the overshoots and undershoots of pressure occurring in the work unit circuit.

Preferably, in relation to repeated cyclic movements in uninterrupted operation, the controller may form one or more observers, such as digital observers, in real time in order to carry out condition monitoring of the central drive, the peripheral equipment and the work units, in real time or cyclically. Advantageously, this results in very precise leak identification.

Further advantages are apparent from the subclaims and the description below of a preferred exemplary embodiment. The features that are mentioned individually in the claims are combinable where this is technologically meaningful, and may be supplemented by explanatory factual material from the description and details from the Figures, with further variant embodiments of the disclosure being indicated.

BRIEF DESCRIPTION OF THE FIGURES

The disclosure is explained in more detail below with reference to an exemplary embodiment that is illustrated in the attached Figures, in which.

DETAILED DESCRIPTION

The disclosure is now explained in more detail by way of example, with reference to the attached drawings. However, the exemplary embodiments are examples, which are not intended to restrict the inventive concept to a particular arrangement. Before the disclosure is described in detail it should be pointed out that it is not restricted to the respective structural parts of the device and the respective method steps, since these structural parts and methods may vary. The terms used here are merely intended to describe particular embodiments and are not used restrictively. Moreover, where the singular or the indefinite article is used in the description or the claims, this also refers to a plurality of these elements unless the overall context unambiguously indicates otherwise.

Figure 1:
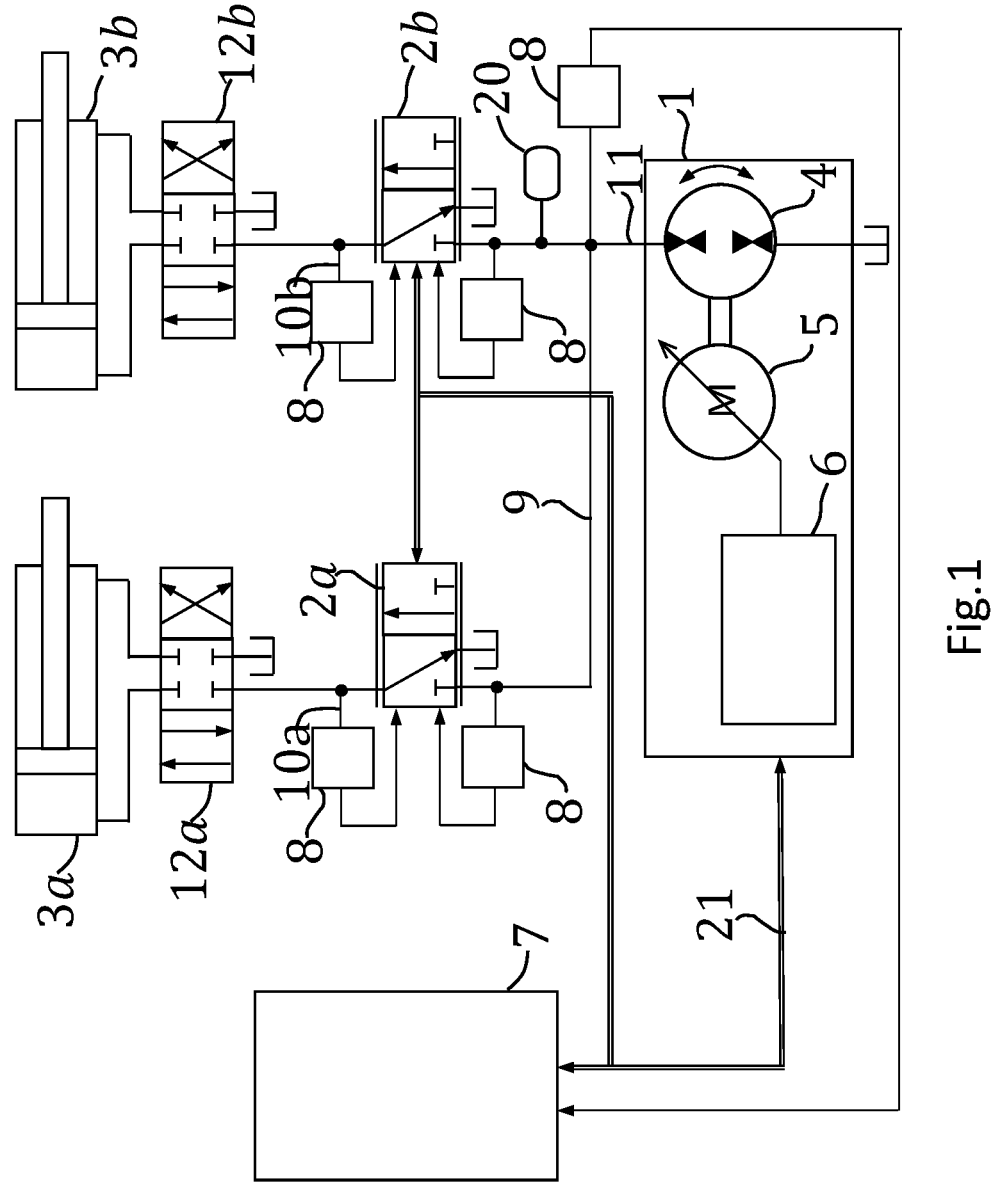
FIG. 1 shows a hydraulic device having two work units.

FIG. 1 shows a hydraulic unit for supplying a plurality of work units, in the exemplary embodiment two work units 3a, 3b, for example an ejector, a nozzle, a core puller or a shut-off nozzle, in particular on a plastics injection molding machine having at least one controller 7, at least one closed-loop valve control and/or open-loop valve control and a central drive 1. The controller 7 may comprise the closed-loop valve control and/or open-loop valve control, and vice versa. A plastics injection molding machine of this kind serves to process plastics and other plasticizable materials, including for example ceramic, metal and/or powder compositions.

As shown in FIG. 1, the central drive 1 may comprise a pump 4 such as a constant pump, a motor 5 such as a servo motor, and a motor controller 6. In principle, however, further work units 3a, 3b may also be provided. In FIG. 1, for each work unit 3a, 3b there is provided a respective switching valve 12a, 12b and a respective closed-loop control valve 2a, 2b. The closed-loop control valves 2a, 2b in the exemplary embodiment of FIG. 1 take the form for example of electronic and/or digital closed-loop flow control valves, p/Q valves with an electric pressure gage function, proportional valves or continuously-adjustable valves which control the volumetric flow to the work units 3a, 3b by closed-loop control.

For each closed-loop control valve 2a, 2b, pressure sensors 8 detect at least one pressure upstream and downstream of the corresponding closed-loop control valve 2a, 2b, the load pressures 10a, 10b of the work units 3a, 3b, and the system pressure 9. The pressures may preferably be transmitted to the controller 7 and/or the closed-loop valve control and/or open-loop valve control, preferably by way of a connection 21 such as a bus. In principle, however, other connections 21 are also conceivable, such as a wireless network. The closed-loop control valves 2a, 2b are preferably in contact with the controller 7 and the central drive 1 and/or the closed-loop valve control and/or open-loop valve control by way of the connection 21.

The closed-loop valve control and/or open-loop valve control has knowledge of the control valve geometry of the closed-loop control valves 2a, 2b. The knowledge may take the form for example of a control characteristic, a volumetric flow signal characteristic or the function "cross section of opening=f(stroke)", or indeed the geometry of the valve slider. In principle, it is conceivable for the knowledge already to be present in the closed-loop valve control and/or open-loop valve control, or to be manually input or automatically made available, for example by way of a network connection. The closed-loop valve control and/or open-loop valve control is configured to derive at least one actual value of volumetric flow for each closed-loop control valve 2a, 2b from a relationship between the control valve geometry and at least one pressure difference that results from the pressures detected upstream and downstream of the at least one closed-loop control valve 2a, 2b.

Figure 3:
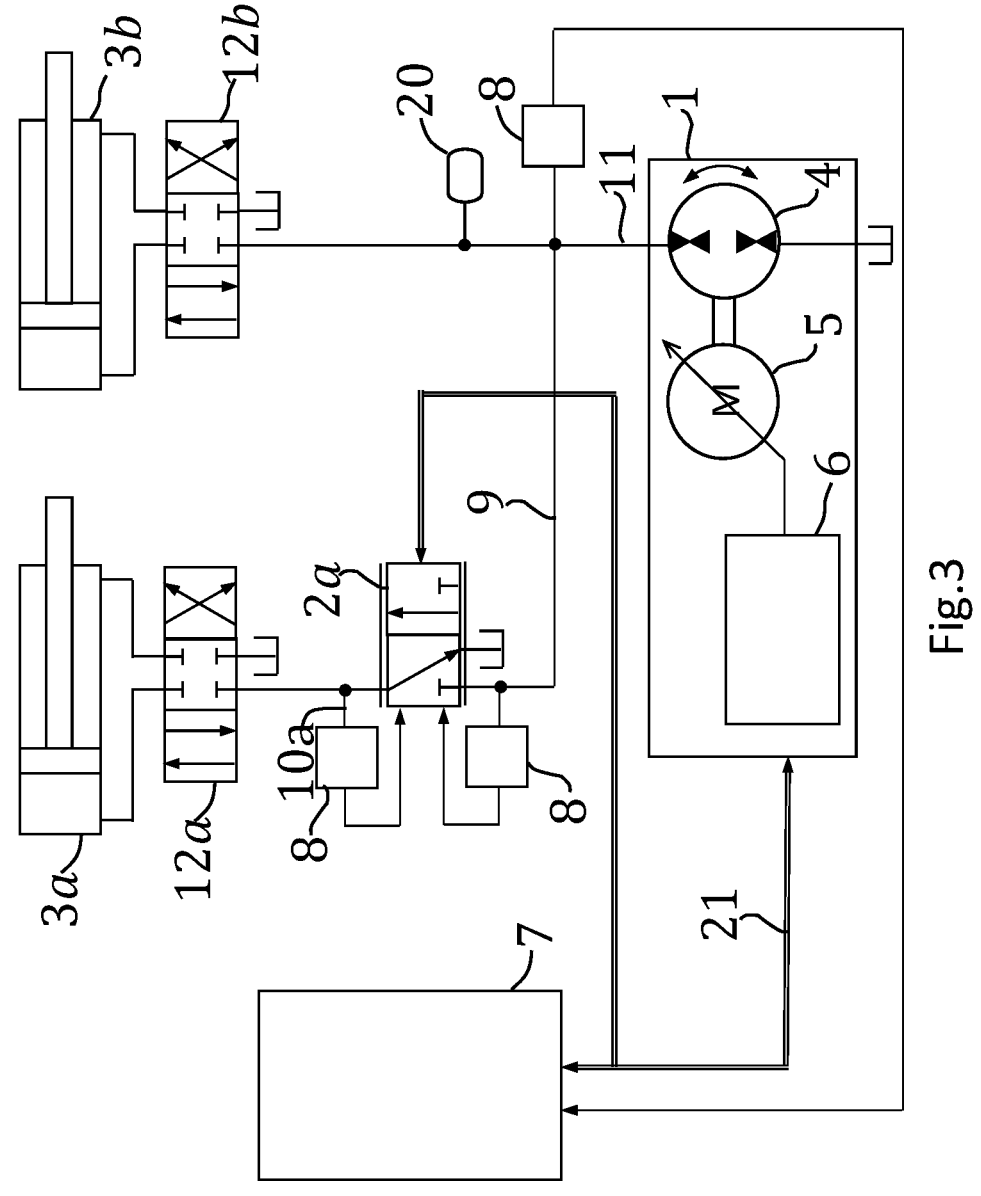
FIG. 3 shows the hydraulic device from FIG. 1 with one closed-loop control valve.

Typically, as a rule a plurality of closed-loop control valves is provided, even though in FIG. 3 only one p/Q valve is provided as the closed-loop control valve 2a, and one switching valve 12a plus one switching valve 12b in the central drive line for purely serial movement.

Even in this case, in which not all—or in FIG. 3 only one—of the work units is equipped with a closed-loop control valve, the device and the method may advantageously be implemented. One of the work units may for example be supplied by way of a switching valve. For example, this could be the work unit of a shut-off nozzle, of which the switching procedure nonetheless has a systemic effect on the other work units. If this is in pressure-maintenance mode, for example, the pre-control needs a minimum of pressure for this simultaneous actuation.

The closed-loop valve control and/or open-loop valve control knows the exact relationship between pressure and the setting of the closed-loop control valve 2a, 2b, with the result that the closed-loop valve control and/or open-loop valve control knows which pressure results in which setting of the closed-loop control valve and vice versa.

In the exemplary embodiment in FIG. 1, the closed-loop control valves 2a, 2b comprise the closed-loop valve control and/or open-loop valve control and knowledge of the control valve geometry of the closed-loop control valves 2a, 2b, including the geometry of the valve slider, and take the form of electronic and/or digital proportional valves. The closed-loop control valves 2a, 2b derive an actual value of volumetric flow, preferably a standardized actual value of volumetric flow, from the relationship between the control valve geometry and the pressure difference, and transmit this actual value of volumetric flow to the controller 7.

The controller 7 is configured to derive, from the setpoint value of volumetric flow of the work units 3a, 3b and/or the actual values of volumetric flow of the closed-loop control valves 2a, 2b, at least one setpoint pre-control for the central drive 1, such that the system pressure 9 corresponds at least to the maximum load pressure of the work units 3a, 3b. It is thus possible for the system pressure to be equal to or even greater by a certain value than the load pressure.

In this way, the at least one closed-loop control valve 2a, 2b can correct for a physically standardized flow rate, for example in liters/min, at the work unit 3a, 3b, in accordance with the predetermined setpoint value and regardless of the system pressure 9 and load pressure 10a, 10b, and can carry out the pressure maintenance function in a quasi-static condition of the closed-loop pressure control, regardless of fluctuations in the system pressure. It goes without saying that this only applies as long as the hydrodynamic preconditions prevail for compensating losses through the valve by a corresponding delta p between the system pressure 9 and the load pressures 10a, 10b. In this way, the at least one closed-loop control valve 2a, 2b is used to set standardized operation commands and/or standardized flow rates and/or standardized volumetric flows of the work units 3a, 3b independently of the system pressure 9 and/or the load pressure of the at least one work unit.

An example should serve to explain this in more detail.

As an example, two types of valve are used, with the first valve having a nominal maximum volumetric flow of for example 180 liters/min and the second valve having a nominal maximum volumetric flow of for example 140 liters/min. In this example, with linearized characteristics and with a control variable of 50% the first valve would be adjusted to a volumetric flow of 90 liters/min and with a control variable of 50% the second valve would be adjusted to a volumetric flow of 70 liters/min, provided that there is sufficient supply pressure.

In this context the term "standardized," for a standardized volumetric flow and/or a standardized flow rate, means that the setpoint value for the volumetric flow and/or the flow rate is for example pre-set to 80 liters/min and both valves are adjusted to a volumetric flow of this kind of 80 liters/min, regardless of fluctuations in pressure and regardless of the nominal maximum volumetric flow. The result is thus a flow rate or volumetric flow that is standardized in dependence on a control variable and is independent of load pressure and system pressure. Preferably, the result is thus, for example when using different valves or indeed if other system components are replaced, that no new closed-loop control/open-loop control needs to be implemented.

In principle, it is also possible to standardize to variables other than the volumetric flow or the flow rate provided a correspondingly associated variable is settable in standardized manner and scaled by way of an operation command.

In this context the term "standardized operation command" means a command by which for example a standardized volumetric flow and/or flow rate may be set. For example, variables to be standardized may be mapped onto (standardized to) a volumetric flow, for example in liters/min, so that the desired volumetric flow may be set or controlled by closed-loop control for example by a characteristic, regardless of the valve used (system and load pressure).

In a further preferred exemplary embodiment, the closed-loop valve control and/or open-loop valve control has knowledge of the hydraulic medium used, such as its viscosity. That is to say that, depending on the medium, a corresponding pressure and valve setting are produced, advantageously resulting in more exact pre-control.

So that there is advantageously no need for re-calibration when the closed-loop control valves 2a, 2b, 13a, 13b are replaced, in a further preferred exemplary embodiment the closed-loop valve control and/or open-loop valve control is provided in or on the closed-loop control valve 2a, 2b, 13a, 13b.

In a further preferred exemplary embodiment, at least one temperature sensor is provided, wherein further preferably at least one temperature sensor, for example a temperature detector, is provided for each closed-loop control valve 2a, 2b, 13a, 13b. Advantageously, measuring the temperature of the hydraulic medium produces a precise prediction of the viscosity, and consequently more exact throughflow.

In a further preferred exemplary embodiment, the pressure sensor 8 is provided in or on the closed-loop control valve 2a, 2b, 13a, 13b, resulting in advantages for restructuring of the machine, such that no special restructuring measures have to be carried out.

Figure 2:
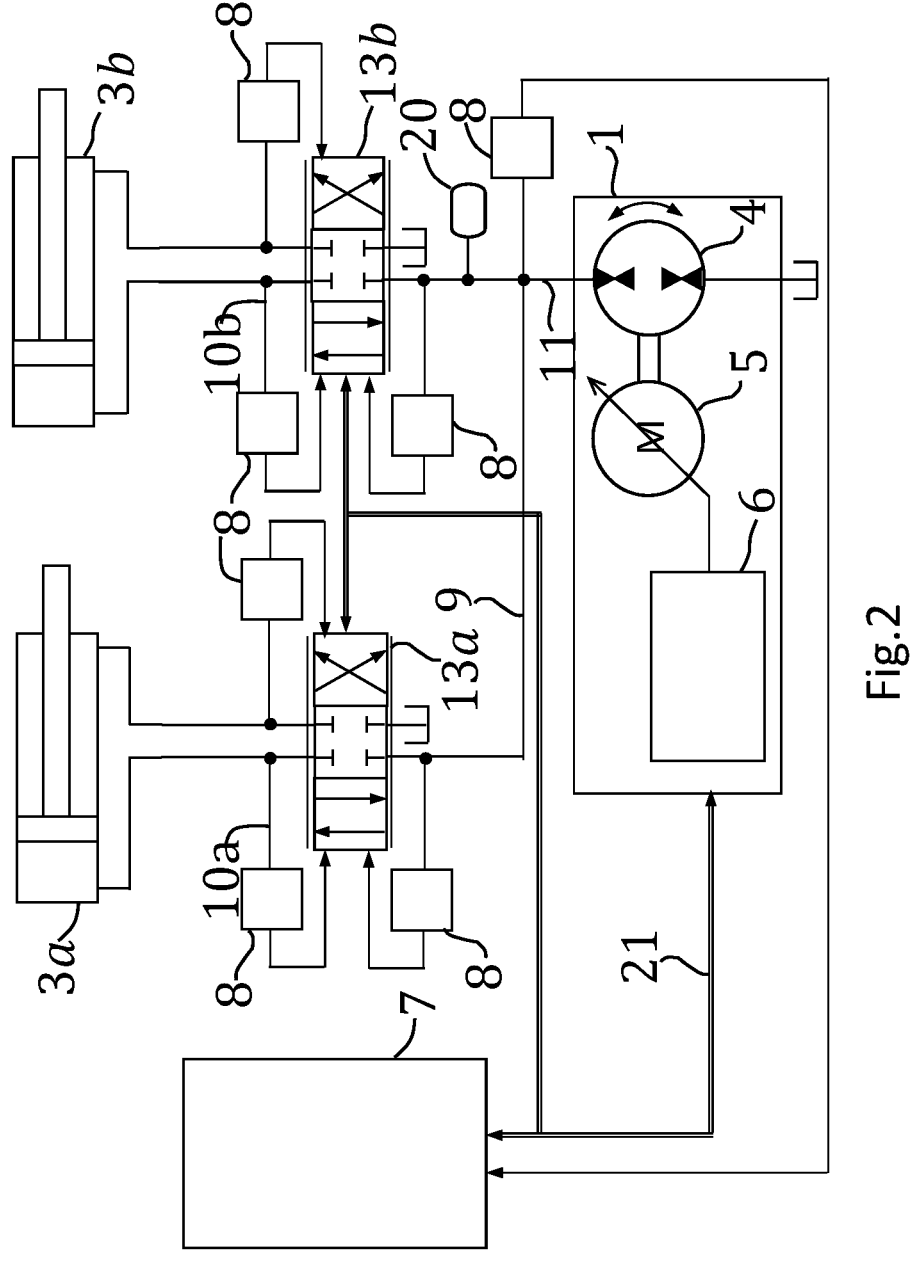
FIG. 2 shows the hydraulic device from FIG. 1 with two closed-loop control valves.

The exemplary embodiment of FIG. 2 corresponds substantially to the exemplary embodiment of FIG. 1, with no switching valves 12a, 12b being present in FIG. 2. The closed-loop control valves 13a, 13b in FIG. 2 there take the form for example of continuously-adjustable valves with a directional function.

The exemplary embodiment of FIG. 3 corresponds substantially to the exemplary embodiment of FIG. 1, wherein in FIG. 3 there is provided only one p/Q valve as the closed-loop control valve 2a, and one switching valve 12a plus one switching valve 12b in the central drive line, for purely serial movement. Consequently, in this case a closed-loop control valve is associated with only the one work unit 3a.

Figure 4A:
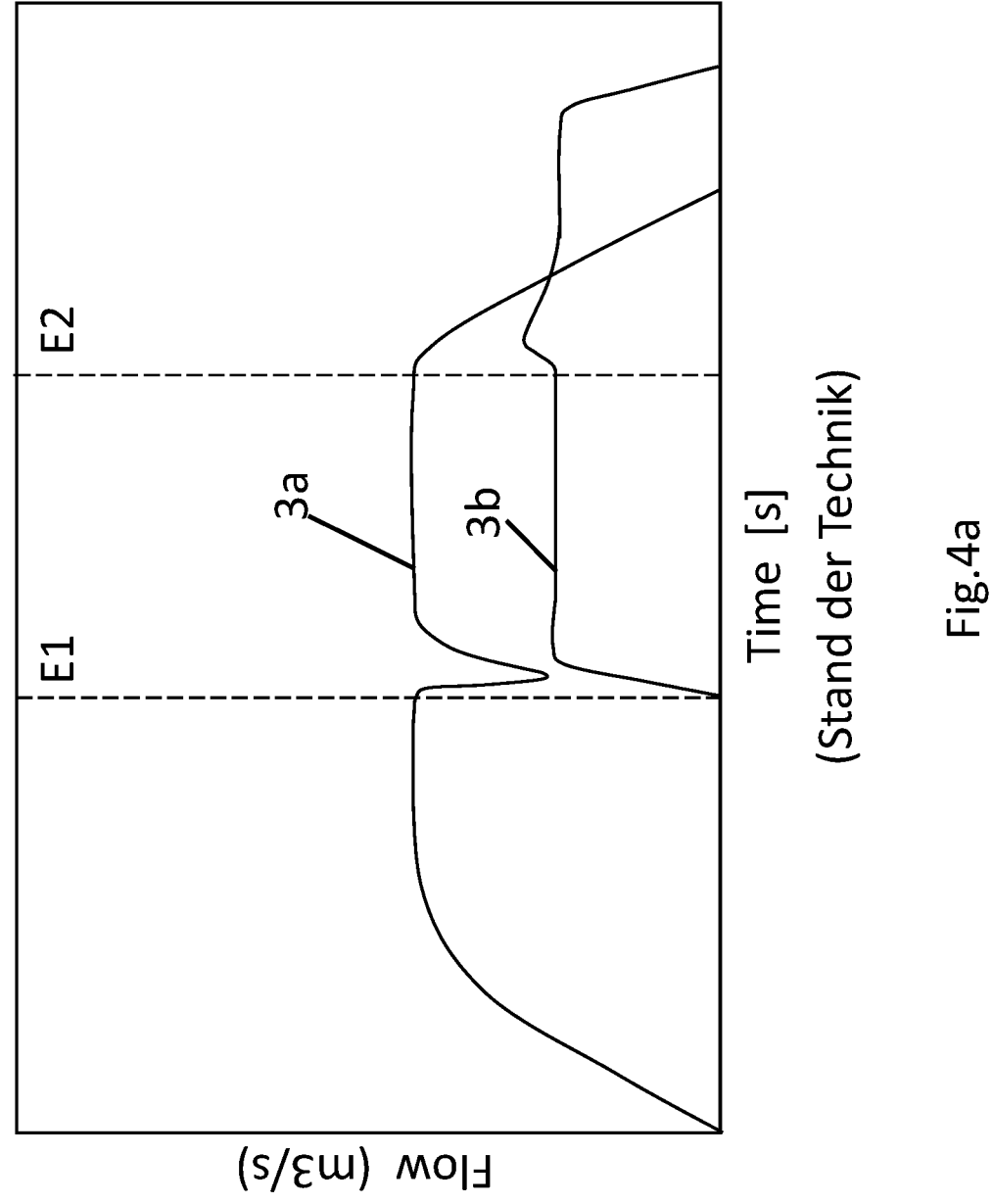
FIG. 4a shows a graph of volumetric flow over time, of two work units without pre-control, according to the prior art.

In FIG. 4a, a graph shows the flow rate in cubic meters per second over time in seconds, for two work units 3a, 3b without pre-control, according to the prior art. First, the first work unit 3a accelerates under high load pressure until, at time point E1, the second work unit 3b accelerates under lower load pressure. As a result of acceleration of the second work unit 3b, a kink, shown in schematically exaggerated form, occurs in the flow rate of the first work unit 3a, since now the second work unit 3b likewise requires a corresponding flow rate as well. At time point E2, the first work unit 3a decelerates, as a result of which it requires a smaller flow rate, which can be seen as an "overshoot" in the second work unit 3b. Thus, the two work units 3a, 3b have a pronounced effect on one another, which can result in errors during the working process and in the quality of the injection molded part.

Figure 4B:
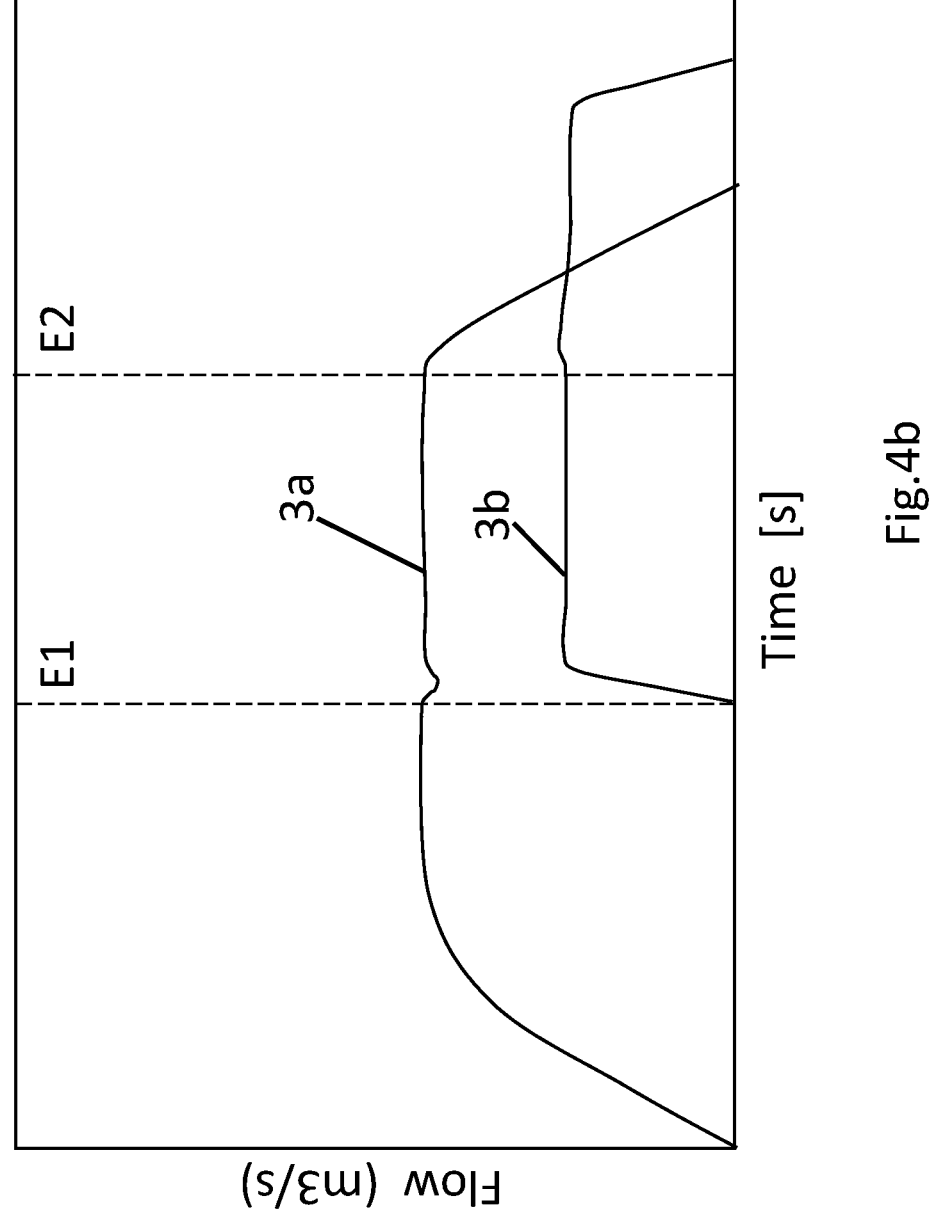
FIG. 4b shows the graph from FIG. 4a, with pre-control.

FIG. 4b shows the same graph as FIG. 4a, but with setpoint pre-control of the central drive 1 by the controller 7. It can be seen, at the time points E1 and E2, that the two work units 3a, 3b have markedly less effect on one another.

Figure 5:
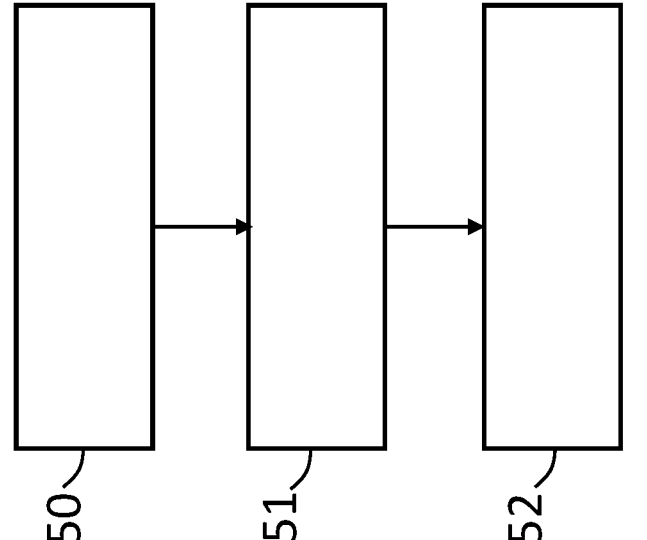
FIG. 5 shows a schematic method chart.

FIG. 5 shows a schematic chart of a method for open-loop control and/or closed-loop control of a hydraulic device for supplying a plurality of work units 3a, 3b, in particular on a plastics injection molding machine, having at least one controller 7 and a central drive 1, wherein at least one closed-loop control valve 2a, 2b, 13a, 13b is provided at at least one of the work units, preferably at all the work units 3a, 3b. In a step 50, at least one pressure difference is determined from at least one detected pressure upstream and downstream of the closed-loop control valve 2a, 2b, 13a, 13b for each closed-loop control valve 2a, 2b, 13a, 13b. In a further step 51, at least one actual value of volumetric flow is derived from a relationship between the geometry of the closed-loop control valve and the pressure difference of the closed-loop control valve 2a, 2b, 13a, 13b for each closed-loop control valve 2a, 2b, 13a, 13b. In a step 52, at least one setpoint pre-control is derived from the setpoint values of volumetric flow of the at least one work unit 3a, 3b and/or the actual values of volumetric flow of the closed-loop control valves 2a, 2b, 13a, 13b for the central drive 1, such that the system pressure 9 corresponds at least to the maximum load pressure 10a, 10b of the work units 3a, 3b and/or exceeds this by a certain value. The value may for example be manually input or have an automatic relationship, for example by way of a network.

In a preferred exemplary embodiment, pre-control of the setpoint value is carried out with time control and/or in real time.

For advantageous identification of a leak, in a further preferred exemplary embodiment a cyclic integration of the standardized volumetric flows that are controlled by the closed-loop control valves 2a, 2b, 13a, 13b is carried out over at least one work unit cycle. It can then be seen from integration whether more hydraulic medium has been used, which may indicate that there is a leak.

In a further preferred exemplary embodiment, for advantageous identification of wear to the valve mechanism, for example on control edges or in the event of a leak through a piston, the actual values of volumetric flow of the closed-loop control valves 2a, 2b, 13a, 13b are continuously monitored, evaluated and correlated with the actual values of volumetric flow for at least one cyclic machine operation.

For the purpose of carrying out serial movements of the work units 3a, 3b, in a preferred exemplary embodiment the closed-loop control valves 2a, 2b, 13a, 13b are operated as switching valves 12a, 12b and/or, for the purpose of carrying out simultaneous movements of the work units 3*a*, 3*b*, are operated as load-sensing closed-loop control valves.

In a further preferred exemplary embodiment, calculation of the setpoint pre-control is adapted with self-optimization, by a cyclically learning observer. Advantageously, an optimum of dynamics and energy consumption per cycle may be obtained by the cyclically learning observer. The superimposition of pressure in the system circuit may thus be adapted with self-optimization, while the quality of closed-loop control in the work unit circuits is observed, in particular the overshoots and undershoots of pressure occurring in the work unit circuit.

It goes without saying that this description may be subject to the most diverse modifications, alterations and adaptations that fall within the range of equivalents to the attached claims.

The invention claimed is:

1. A hydraulic device for supplying a plurality of work units, comprising
a controller,
at least one of a closed-loop valve control or an open-loop valve control, and
a central drive,
wherein there is associated with at least one of the work units at least one closed-loop control valve having a control valve geometry,
wherein pressure sensors are provided which are configured to detect for each closed-loop control valve at least one pressure upstream and downstream of the closed-loop control valve, a load pressure of the work units and a system pressure,
wherein the at least one of the at least one of the closed-loop valve control or the open-loop valve control has knowledge of the control valve geometry of the closed-loop control valves and is configured to derive at least one actual value of volumetric flow for each closed-loop control valve from a relationship between the control valve geometry and at least one pressure difference that results from a pressure detected upstream and a pressure detected downstream of the closed-loop control valves, and
wherein the controller is configured to derive, from a setpoint of volumetric flow of the at least one of the work units and from the at least one actual value of volumetric flow of the at least one closed-loop control valve, at least one setpoint pre-control for the central drive, such that the system pressure corresponds at least to a maximum load pressure of the work units, wherein the closed-loop control valves can be used to set at least one of standardized operation commands, standardized flow rates, or standardized volumetric flows, of the at least one of the work units independently of the system pressure and the load pressure of the at least one of the work units.

2. Hydraulic device as claimed in claim 1, wherein the respective closed-loop control valve is associated with each work unit (3*a*, 3*b*).

3. Hydraulic device as claimed in claim 1, wherein the closed-loop valve control or the open-loop valve control is provided in or on the closed-loop control valve (2*a*, 2*b*, 13*a*, 13*b*).

4. Hydraulic device as claimed in claim 1, wherein the closed-loop valve control or the open-loop valve control has knowledge of the hydraulic medium used.

5. Hydraulic device as claimed in claim 1, wherein at least one temperature sensor is provided, preferably in that at least one temperature sensor is provided for each closed-loop control valve (2*a*, 2*b*, 13*a*, 13*b*), and in that the at least one temperature sensor is provided in or on the closed-loop control valve (2*a*, 2*b*, 13*a*, 13*b*).

6. Hydraulic device as claimed in claim 1, wherein the pressure sensors (8) are provided in or on the closed-loop control valve (2*a*, 2*b*, 13*a*, 13*b*).

7. Hydraulic device as claimed in claim 1, wherein the control valve geometry of the closed-loop control valves (2*a*, 2*b*, 13*a*, 13*b*) comprises the slide-valve geometry of the valve slide.

8. Hydraulic device as claimed in claim 1, wherein the hydraulic device is a hydraulic device on a plastics injection molding machine for processing plastics and other plasticizable materials.

9. A method for open-loop or closed-loop control of a hydraulic device for supplying a plurality of work units as claimed in claim 1, wherein
for each closed-loop control valve at least one pressure difference is determined from at least one detected pressure upstream and downstream of the closed-loop control valve,
at least one actual value of volumetric flow for each closed-loop control valve is derived from a relationship between the control valve geometry and the pressure difference of the closed-loop control valve,
at least one setpoint pre-control for the central drive is derived from at least one setpoint of volumetric flow of the at least one of the work units and the at least one actual value of volumetric flow of the at least one closed-loop control valve, such that a system pressure corresponds at least to a maximum load pressure of the work units,
wherein the at least one closed-loop control valve is used to set at least one of standardized operation commands or standardized flow rates or standardized volumetric flows of the at least one of the work units independently of the system pressure and the load pressure of the at least one of the work units.

10. Method as claimed in claim 9, wherein a respective closed-loop control valve controls the pressure of each work unit.

11. Method as claimed in claim 9, wherein the setpoint pre-control is carried out with time control or in real time.

12. Method as claimed in claim 9, wherein at least one cyclic integration of the standardized volumetric flows that are controlled by the closed-loop control valves is carried out over at least one work unit cycle.

13. Method as claimed in claim 9, wherein the actual values of volumetric flow of the closed-loop control valves are continuously monitored, evaluated and correlated with the actual values of volumetric flow for at least one cyclic machine operation.

14. Method as claimed in claim 9, wherein the at least one closed-loop control valve is operated as a switching valve during serial movements of the work units.

15. Method as claimed in claim 9, wherein the at least one closed-loop control valve is operated as a load-sensing closed-loop control valve during simultaneous movements of the work units.

16. Method as claimed in claim 9, wherein a derivation of the setpoint pre-control is adapted with self-optimization by a cyclically learning observer.

17. Method as claimed in claim 9, wherein the hydraulic device supplies a plurality of work units on a plastics injection molding machine for processing plastics and other plasticizable materials.

* * * * *